Figure 1:
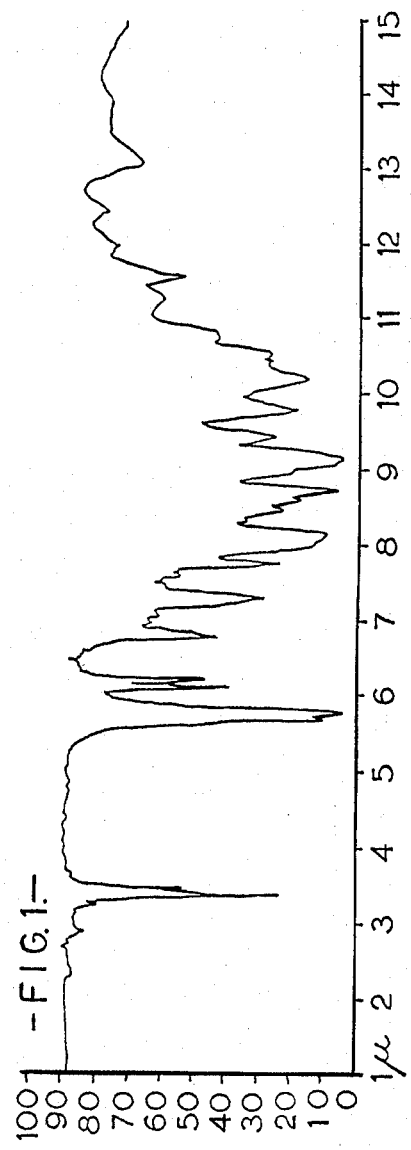

United States Patent [19]
Thies et al.

[11] 3,869,476
[45] Mar. 4, 1975

[54] THERAPEUTICALLY ACTIVE ISOVALERIC ACID ESTERS

[75] Inventors: Peter Willibrord Thies; Walter Kucaba, both of Hannover; Siegfried Funke, Hannover-Kirchrode, all of Germany

[73] Assignee: Kali-Chemie Aktiengesellschaft, Hannover, Germany

[22] Filed: Sept. 27, 1967

[21] Appl. No.: 676,667

Related U.S. Application Data

[63] Continuation-in-part of Ser. Nos. 339,581, Jan. 23, 1964, Pat. No. 3,422,090, and Ser. No. 385,021, July 24, 1964, abandoned.

[52] U.S. Cl. .............................. 260/345.2, 424/283
[51] Int. Cl. .............................................. C07d 7/20
[58] Field of Search ...................... 260/345.2, 236.5

[56] References Cited
UNITED STATES PATENTS
3,422,090    1/1969    Thies et al. ...................... 260/236.5

OTHER PUBLICATIONS
Krepinsky et al., Coll. Szechosl Chem. Comm., Vol. 24, pp. 1,884–1,896, (1959).
Stoll et al., Helv. Chim. Acta, Vol. 40, pp. 1,205–1,229, (1957).
Schultz et al., Arzneium Forsch., vol. 12, pp. 12–15, (1962).

*Primary Examiner*—John M. Ford
*Attorney, Agent, or Firm*—Weiser, Stapler & Spivak

[57] ABSTRACT

Novel therapeutically valuable isovaleric acid esters having the empirical formulae $C_{22}H_{30}O_8$, $C_{22}H_{32}O_8$ and $C_{24}H_{32}O_{10}$ are produced by extracting roots and rhizomes of plants of the family Valerianaceae at a temperature below 30° C with a lipophilic solvent in the presence of an aliphatic carboxylic acid at a $p_H$ between 3 and 7. Separation of the esters can be obtained by crystallization or by chromatography of the extract on alumina, which has been partly inactivated by a treatment with an aliphatic carboxylic acid in a water-free medium using as eluting agent the first members of the eluotropic series or by chromatography on activated carbon or on silica gel of a particle size between 0,2 and 0,05 mm using as eluting agent an aliphatic alcohol or chlorinated hydrocarbons.

4 Claims, 6 Drawing Figures

THERAPEUTICALLY ACTIVE ISOVALERIC ACID ESTERS

This application is a continuation-in-part of copending applications Ser. No. 339,581, filed Jan. 23, 1964, now U.S. Pat. No. 3,422,090, entitled Process of Producing Esters From Plants of the Genus Valeriana and Ser. No. 385,021, filed July 24, 1964, now abandoned, entitled Therapeutically Valuable Isovaleric Acid Ester and Its Isolation.

Known preparations from plants of the genus Valeriana and especially of the plant *Valeriana Officinalis* contain sedative components. They are commonly used tranquilizing agents of a rather broad therapeutically effective range. Their therapeutic activity, however, is not due to a single specific effective component and is even considered highly questionable.

Sedatively effective extracts from roots and rhizomes of plants of the genus Valeriana obtained by extraction with non-aqueous solvents contain an indefinite mixture of organic esters in combination with numerous other compounds such as hydrocarbons, ketones, carboxylic acids, and alcohols of the terpene series. On saponification of such a mixture according to known methods, isovaleric acid can be detected as principal acid component while the corresponding alcohols are converted into resins.

Extensive studies, furthermore, have shown that not only sedative agents but also stimulating agents are present in preparations obtained by extracting roots and rhizomes of Valeriana plants, that is, agents the therapeutic effects of which counteract each other. It is known, for instance, to isolate and recover a spasmolytically effective ester of isovaleric acid in a yield of less than 0.1 percent by extracting 125 kg of roots of the plant *Valeriana officinalis*.

Furthermore, it is known to isolate and recover from *Valeriana wallichii* an ester designated as "substance F" which contains caproic acid in addition to isovaleric acid, in a yield of less than 0.6 percent. Said known process of isolating the ester substance F consists in a very complicated and, therefore, technically impracticable process. Moreover the therapeutic effect of the substance F is not known.

It is one object of the present invention to provide a simple and effective process of producing the valuable isovaleric esters from extracts of plants of the general Valeriana and Centranthus in a high yield and in the pure state.

A further object of the present invention is to provide a simple and effective process of producing such therapeutically valuable esters from plants of the genus Valeriana in a high yield.

Another object of the present invention is to provide esters from plants of the genus Valeriana which esters are of a surprisingly high degree of purity.

Another object of the present invention is to provide valuable isovaleric acid esters of high sedative and spasmolytic activity.

A further object of the present invention is to provide pharmaceutical compositions containing the valuable isovaleric acid esters obtained by carrying out the improved process.

It is another object of the present invention to provide valuable sedative and spasmolytic compositions containing active esters present in plants of the genus Valeriana and being useful in therapy as sedative agents or as spasmolytic agents in the treatment of nervous cardiac disorders, hysteria, neurasthenia, headaches, and, in general, states of excitation and agitation, and the like.

Still another object of the present invention is to provide a method of causing sedation and spasmolytic effects by administering such compositions therapeutically.

Still another object of the present invention is to provide a process of causing sedation in humans and animals by the administration of such valuable pharmaceutical compositions.

Other objects of the present invention and advantageous features thereof will become apparent as the description proceeds.

The present invention relates to improvements in the process of producing therapeutically valuable isovaleric acid esters and more particularly to a process of producing such esters from roots and/or rhizomes of plants of the family Valerianaceae, especially those of the genera Valeriana and Centranthus, to products and specific novel compounds obtained thereby, to pharmaceutical compositions containing the same and to their use in therapy.

The invention relates more particularly to a method of sedation and pharmaceutically active drugs for achieving tranquillizing effects in a patient without at the same time producing the soporific, or sleepiness, effect usually produced in a patient who is administered a sedative. This surprising effect is obtained when a compound of the invention, or a mixture thereof, is administered to the patient at a dose of at least about 20 mg.

Valuable isovaleric acid esters which have a sedative and spasmolytic activity can be produced from plants of the genus Valeriana. For instance, a process of recovering and isolating therapeutically valuable isovaleric acid esters from extracts of roots and/or rhizomes of such plants in lipophilic solvents by distribution separation between hydrocarbons or halogenated hydrocarbons and aliphatic carboxylic acids with 2 to 7 carbon atoms is described in copending application Ser. No. 339,581, embodied herein, now U.S. Pat. No. 3,422,090.

The valuable isovaleric acid esters obtained thereby are separated and recovered in pure form by chromatography, such as by applying extracts of parts of plants of the genus Valeriana to a column of chromatographic alumina which has been partially inactivated by a treatment with an aliphatic carboxylic acid having 2 – 7 C atoms in a water free medium and eluting the ester by means of a non-aqueous lipohilic solvent. Such a process is described, for instance, in copending application Ser. No. 385,021 and Ser. No. 519,986, embodied herein.

EXTRACTION OF ESTERS

In an embodiment of the invention, the therapeutically valuable esters of the invention are prepared from roots and/or rhizomes of plants of the genus Valeriana, such as from *Valeriana officinalis* or *Valeriana wallichii* in a remarkably high yield and in a surprisingly high degree of purity by extracting the plants with a lipophilic solvent in the presence of an aliphatic carboxylic acid at a slightly acid $p_H$-value between about 3.0 and about 7.0, often in the range of 4.0 to 6.0 and at a temperature below 30° C. The concentrated extract is dissolved in analiphatic carboxylic acid; then, ethereal oils, fatty acids or esters, and higher hydrocarbons are extracted with a lipophilic solvent, consisting of a hydrocarbon or a halogenated hydrocarbon; then, after step-wise dilution of the treated acid solution with water, the isovaleric acid esters are extracted from the diluted acid solution with a water immiscible solvent. They can be isolated by crystallization or by chromatography of the extract on an aluminum oxide which has been partially inactivated by means of a carboxylic acid in a non-aqueous medium or on activated carbon or on silical gel of a particle size between 0.2 and 0.05 mm.

Lipophilic solvents useful in this extraction process are, for instance, hydrocarbons, halogenated hydrocarbons, ethers, esters, ketones, and alcohols. During the process, the $p_H$ is maintained within the desired range by having present an acidic agent, especially an aliphatic carboxylic acid, preferably an acid of 2 to 7 carbon atoms. If desired, instead of the aliphatic carboxylic acid there may be used the acidic derivative thereof, if desired together with the alkali metal salts or the ammonium salts thereof.

Alternatively, the process may be carried out by treating the plants with the aliphatic carboxylic acids, that is, without the addition of lipophilic solvents, preferably using the acid in mixture with a metal salt thereof which acts as buffering agent.

It is important that the extraction of the esters of the invention be carried out at a $p_H$ range of 3 to 7 preferably between 4.0 to 6.0 in order to minimize their decomposition and to obtain them in essentially quantitative yield. Decomposition of the sensitive esters of the invention is apparently avoided by the addition of the acidic agents and by operating at a slightly acid $p_H$-range. This extraction method allows the nearly quantitative recovery of the isovaleric acid esters, which are contained in the roots or rhizomes of plants of the family Valerianaceae in an amount from about 0.5 to about 6 percent based on the dried Valeriana plants.

In the process of obtaining the esters of the invention, fresh or dried roots or rhizomes of plants of the family Valerianaceae are crushed and finely comminuted and then extracted by means of a lipophilic solvent to which, for instance, 1 to 10 percent of an aliphatic carboxylic acid having 2 – 7 carbon atoms such as as glacial acetic acid has been added. The roots or rhizomes may also be extracted by means of the carboxylic acid, for instance by means of glacial acetic acid alone, preferably with the addition of ammonium or alkali metal salt of the carboxylic acid. Precaution is taken that the extraction temperature is maintained below 30° C. The resulting extract is deacidified and freed insofar as possible of the extracting solvent by distillation in a vacuum, at a temperature below 30° C. The residue is dissolved, for instance, in 90 percent acetic acid and the resulting solution is exhaustively extracted by a repeated treatment with solvents which have limited miscibility with water, such as, hydrocarbons and/or halogenated hydrocarbons, to extract its lipophilic contaminants, like ethereal oils, fatty acids or esters, and higher hydrocarbons. The valuable isovaleric esters are extracted from the acid solution by shaking the acid solution with a water imiscible solvent after stepwise dilution of the acetic acid phase with water. This extraction process may be repeated several times using as water immiscible solvents hydrocarbons, halogenated hydrocarbons, ethers and others. The combined phases containing the isovaleric acid esters are neutralized by a treatment with a small amount of 2 percent diluted aqueous sodium hydroxide solution, washed with water, dried over sodium sulfate and concentrated by evaporation in a vacuum at a temperature below 30° C.

The oily ester fraction obtained according to the above process of the invention contains a number of isovaleric acid esters which can be separated only with difficulty by chromatography. The ester fraction differs somewhat in its quantitative composition depending upon the starting plant material used.

The extreme sensitivity and the high tendency of the desired isovaleric acid esters to decompose by the action of alkalies, mineral acids, and/or high temperatures probably is the reason that, heretofore, such esters have not been found and isolated although they are the main carriers of the therapeutic effectiveness of plants of the genus Valeriana and although such drugs have been used in therapy for centuries.

ISOLATION AND SEPARATION OF ESTERS WITH ALUMINA

It is known that isovaleric acid esters isolated from roots and rhizomes of plants of the genus Valeriana are decomposed when subjected to chromatography on commercial alumina. For this reason chromatography on such a chromatographic alumina, heretofore, was unsuccessful in separating and isolating the sedative esters from such mixtures of esters. The process according to the present invention, as has been found, now permits the chromatographic isolation and separation of such esters. The present process consists in principle in using a specifically pretreated and partly inactivated alumina as chromatographic adsorption agent.

More specifically, it has been found, in accordance with this invention, that the esters of the invention can be isolated and separated by chromatography if the extraction is carried out on chromatographic alumina which has been pre-treated and thereby made partially inactive with an aliphatic carboxylic acid, preferably having 2 to 7 carbon atoms in a water free medium.

In accordance with this aspect of the process for obtaining the esters of the invention, there may be used a neutral or basic alumina as it is prepared, for instance, according to Brockmann (Ber. dtsch. chem. Ges., vol. 74 (1941), pages 73–78). The alumina is partly inactivated by a treatment with a aliphatic carboxylic acid with 2 to 7 carbon atoms in an anhydrous, lipophilic solvent, if desired with the addition of dioxane, acetone, and esters such as, for instance, amyl acetate or glycerol mono-acetate, or mixtures of such solvents. It is a necessary feature of the inactivation process according to the present invention that it be carried out in a non-aqueous medium in order to obtain satisfactory partial inactivation of the alumina. If, for instance, commercially available alumina is treated with an excess of a solution of 50 parts, by volume, of glycerol mono-acetate, 1 parts to 5 parts, by volume, of glacial acetic acid, and 200 parts, by volume, of acetone, reaction of the alumina with the added solution takes place with generation of heat. A similar treatment can be effectuated with 5 parts, by volume, of glacial acetic acid and 100 parts, by volume, of n-heptane. Subsequently, the acid components are removed by washing with the same solvent as used for elution of the ester. In accordance with this invention, such a pretreated, partly inactivated alumina provides a chromatographic means and method for isolating the sensitive therapeutically effective esters of the invention from extracts of roots and rhizomes of the family Valerianaceae without decomposition of the esters.

Further, in accordance with the invention, the esters of the invention are best isolated and separated by using solvents of the first range of the eluotropic series or with corresponding iso-eluotropic mixtures. Typical such solvents are n-hexane, n-heptane, petroleum ether, benzine (b.p. 50°–75° C), cyclohexane, carbon tetrachloride, and others or an isoeluotropic mixture such as n-heptane/ethyl methyl ketone, hexane/acetic acid ethyl ester, hexane/ethyl methyl ketone, benzene/acetic acid ethyl ester, benzene/ethyl methyl ketone. In these eluotropic series, the solvents are arranged in order of their eluting (washing) power as described, for instance, by W. Trappe: "Biochem. Z." vol. 305, page 150 (1940), H. H. Strain: "Adsorption Analysis" published by Interscience, New York, 1942; H. S. Knight and S. Groemings: "Analyt. Chem." vol. 26, page 1,549 (1954).

According to the present invention, a non-aqueous lipophilic extract of plants of the family Valerianaceae is applied to a column of partially inactivated alumina and the adsorbed therapeutically effective components are eluted by means of a non-aqueous solvent, preferably by means of a solvent of the first range of the eluotropic series or, respectively, by means of a corresponding iso-eluotropic mixture of solvents, to which, for the elution of the ester $C_{24}H_{32}O_{10}$, a more polar solvent, such as a ketone, is added. The first fractions are discarded and the consecutive eluate fractions are gathered separately each containing one of the three isovaleric acid esters in the sequence $C_{22}H_{30}O_8$, $C_{22}H_{32}O_8$, $C_{24}H_{32}O_{10}$. The collected fractions are then worked up in the conventional manner, i.e., they are washed, for instance, with a sodium bicarbonate solution, sodium carbonate solution or sodium hydroxide solution until acidfree and subsequently with water, then dried over sodium sulfate or magnesium sulfate and concentrated by evaporation in a vacuum at 30° C to constant weight.

Isovaleric acid ester of the formula $C_{22}H_{30}O_8$ is obtained by the above process embodiment and is characterized by the following properties:

The ester is a colorless, highly viscous oil of aromatic odor and slightly soapy, bitter and burning taste. It optical rotation is:

[λ] (28/D) = 167° (in methanol; concentration = 1.035%; l = 1 dm)

Its refractive index is:

$n_D^{20}$ = 1.4906.

The maxima of its ultraviolet spectrum are:

λ max$_1$ = 256 mμ (ε= 16,050) in methanol;
λ max$_2$ = 204 mμ (ε= 4,000) in methanol.

The following reactions may be used for identifying the ester:

On shaking a benzine solution of the ester with a solution of acetic acid and hydrochloric acid, the ester is dissolved instantaneously, thereby forming an intense, blue dyestuff in the acid layer. On carefully carrying out this reaction, a yellow color can be observed indicating an intermediate state of the reaction.

ISOLATION AND SEPARATION OF ESTERS WITH ACTIVATED CARBON OR SILICA GEL

Another process embodiment according to the present invention comprises the steps of a. producing lipophilic extract from the rhizomes and/or of roots plants of the genera Valeriana and Centranthus;

b. causing chromatographic adsorption of such an extract on activated carbon or silica gel of a particle size between 0.2 and 0.05 mm;

c. selectively eluting the sorbed therapeutically valuable isovaleric acid esters from the activated carbon or silica gel by means of a lower alcohol or a halogenated hydrocarbon;

d. separating and isolating said isovaleric acid esters from said organic solvent.

This process embodiment has many advantages compared with the known processes.

1. The amount of chromatographic adsorbing agent required is substantially lower.

2. The control of the eluate fractions is simplified because all undesired compounds of the Valeriana plants are contained in the first fractions of the eluate, whereas the residual last fractions contain the three therapeutically valuable isovaleric acid esters described hereinafter. For example, the control of the eluate is necessary only during the first part of the elution step, because the residual fractions all contain the said valuable compounds and not the undesired accompanying substances.

3. It is a further advantage of this process according to the invention that no pretreatment of the adsorbing agent is necessary.

4. No prior purification of the lipophilic raw extracts is required.

The production of the lipophilic extracts of rhizomes and/or roots of plants of the genera Valeriana and Centranthus is well known. Fresh extracts obtained as described in the Pharmacopoeia are suitable for the purposes of this invention. It is pointed out that the raw extracts can be used as such and that no prior purification is necessary. In most cases the raw extracts are concentrated by evaporation of the solvent and subsequently dissolved in a small amount of a lipophilic solvent before chromatography on activated carbon or silica gel. The preferred extracts are those obtained by extraction with methanol or ethyl acetate. Other solvents such as hydrocarbons, and halogenated hydrocarbons, such as petroleum ether, methylene chloride, ketones such as acetone, ethers such as tetrahydrofuran, and others can also be used for extraction.

While activated carbon is without effect upon the therapeutically effective isovaleric acid esters, it has been found that silica gel as it is usually employed in chromatography has a decomposing and degrading effect upon the isovaleric acid esters. It has now been found that the silica gel does not cause decomposition and degradation if its particle size range is between 0.2 and 0.05 mm. and this range is preferred.

Adsorption of the isovaleric acid esters of the lipophilic starting extracts on activated carbon or silica gel chromatographic means is effected by placing the concentrated extract dissolved in a lipophilic solvent on the column of the adsorbing agent.

Elution is effected by passing sufficient amounts of a lower aliphatic alcohol with 1 – 4 carbon atoms or a halogenated hydrocarbon through the activated carbon or silica gel column having adsorbed thereon the active isovaleric acid esters. For the selectivity of the elution it is, of course, necessary that the column filled with the adsorbing agent has a sufficient height, so that the eluting solvent passes a sufficient distance through the adsorbing agent. In general, a height of at least about 10 cm. of the column filled with the adsorbing agent is necessary per gram of extract.

Preferably elution takes place at room temperature. If the adsorbing agent is of a very small particle size, for example, less than about 0.1 mm, the elution velocity may be enhanced by passing the solvent under a slight pressure through the column.

Organic solvents which are suitable eluting agents for practice of this embodiment are, for instance, lower alcohols such as methanol, ethanol, propanol, butanol, or halogenated hydrocarbons such as carbon tetrachloride, chloroform, trichloro ethylene. Mixtures of said solvents may also be used.

This invention relates to a new class of therapeutically and especially sedatively active isovaleric acid esters, particularly, $C_{22}H_{30}O_8$, $C_{22}H_{32}O_8$ and $C_{24}H_{32}O_{10}$, and to valuable compositions comprising the esters. The esters are obtained from plants of the family Valerianaceae, especially genera Valeriana and Centranthus, as described herein above.

The new class of compounds of the invention which were assigned the following generic formula A:

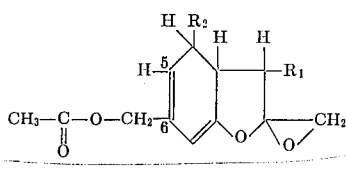

were confirmed by recent investigations regarding their structure especially their nuclear magnetic resonance spectrum to have a different structure. These investigations confirm that the basic ring system of the new class of compounds is not a benzofuran ring system, as depicted above, but is a cyclopenteno [c] pyron ring system as depicted below, which is isomer to the benzofuran ring system. The new compounds, thus, correspond to the following structural formula B:

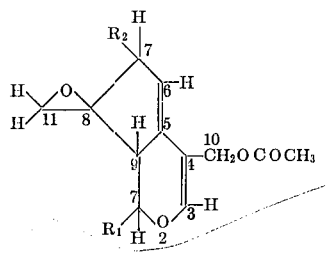

In the above structural formulae, $R_1$ and $R_2$ represent isovaleroxy and β-acetoxy-isovaleroxy groups. When $R_1$ and $R_2$ represent, each one taken individually, the isovaleroxy group, the structural formula represents a first ester which has the empirical molecular formula $C_{22}H_{30}O_8$. The second ester represented by the formula is the corresponding ester saturated at the shown 5,6 - ethylenic unsaturation, resulting in the corresponding 5,6- dihydro ester which has the empirical molecular formula $C_{22}H_{32}O_8$. The third ester represented by the formula is the ester in which one of $R_1$ and $R_2$ represents a β-acetoxy-isovaleroxy group and the other of $R_1$ and $R_2$ represents an isovaleroxy group; this ester has an empirical molecular formula of $C_{24}H_{32}O_{10}$.

For simplicity in describing the invention, the empirical formulae are used through this description of the invention. However, it is to be understood that the compounds referred to by the empirical formulae correspond to and have, in each instance, respectively, the above names and structural formulae of formula B.

Figure 2:
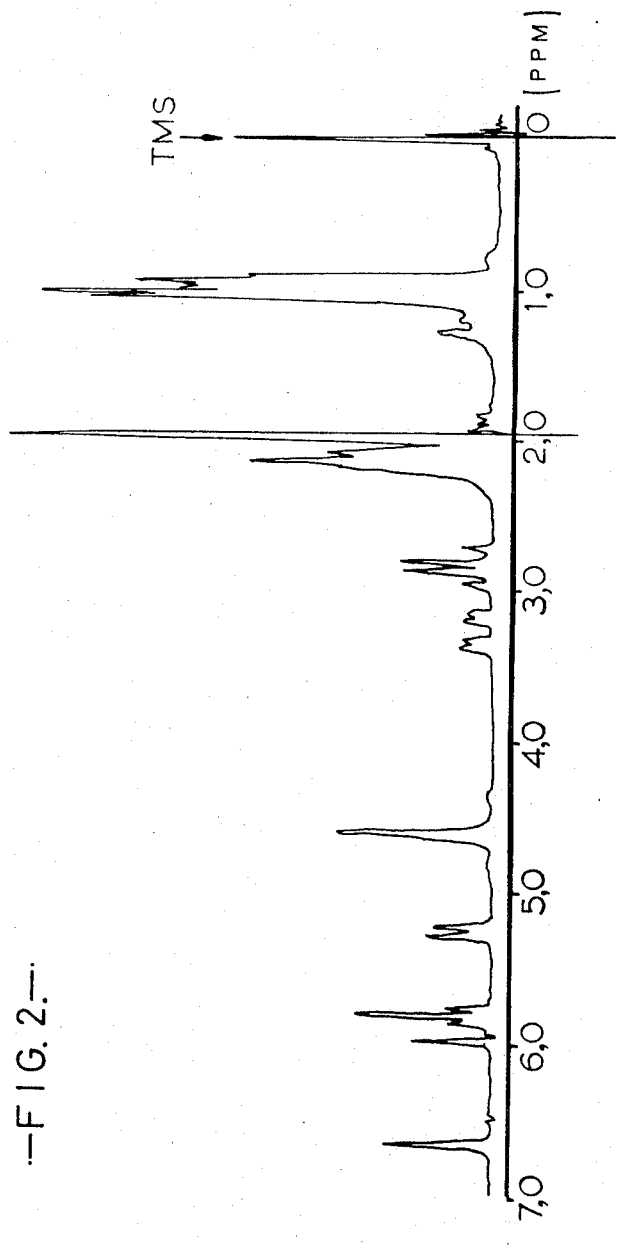

The esters of the invention are characterized by the following features. The ester of the empirical molecular formula $C_{22}H_{30}O_8$ has the properties described above. Its IR-spectrum and its nuclear magnetic resonance (NMR) spectrum are shown in FIGS. 1 and 2.

Figure 3:
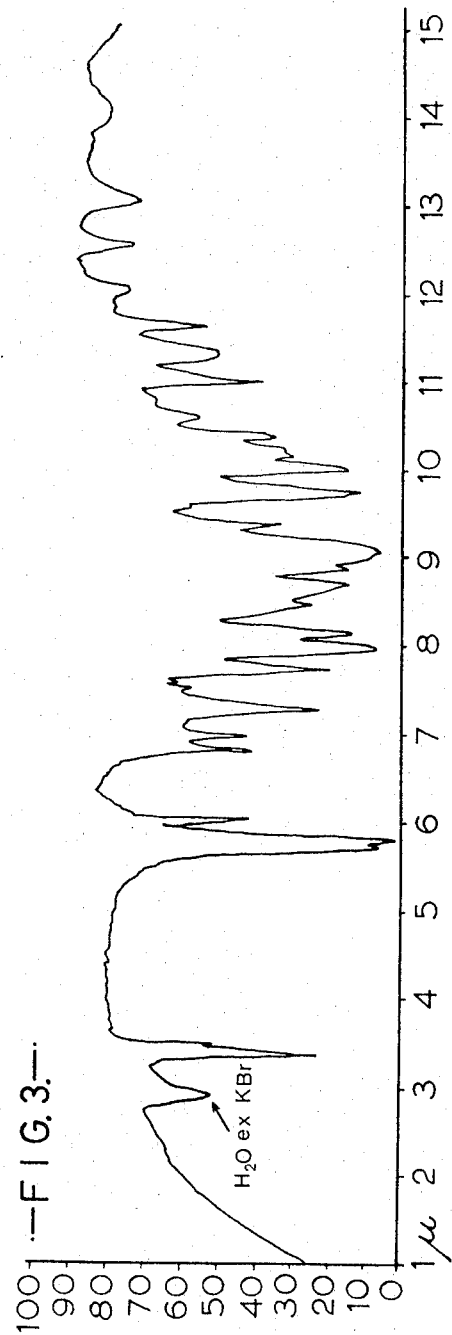
Figure 4:
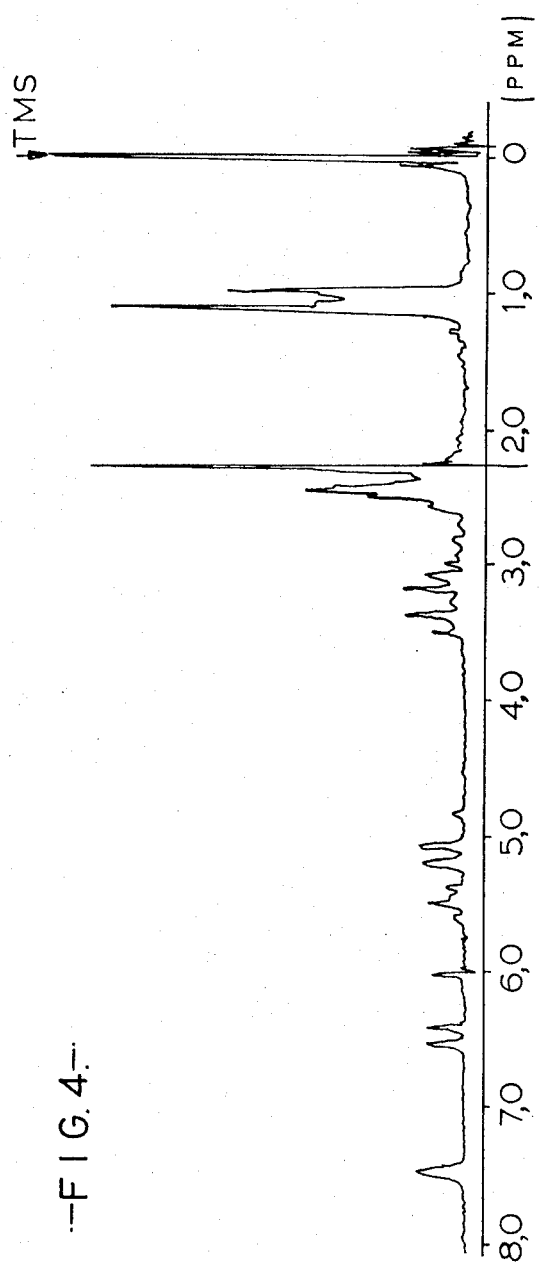

The ester of the empirical molecular formula $C_{22}H_{32}O_8$ crystallizes in the form of long white needles which melt at a temperature of 58°– 63° C. The optical rotation $[\alpha]_D^{20}$ is −79° (in methanol), the UV-maximum in methanol is at 214 − 216 mμ, and is dependent on concentration. The IR-spectrum and the NMR spectrum are represented by FIGS. 3 and 4.

Figure 5:
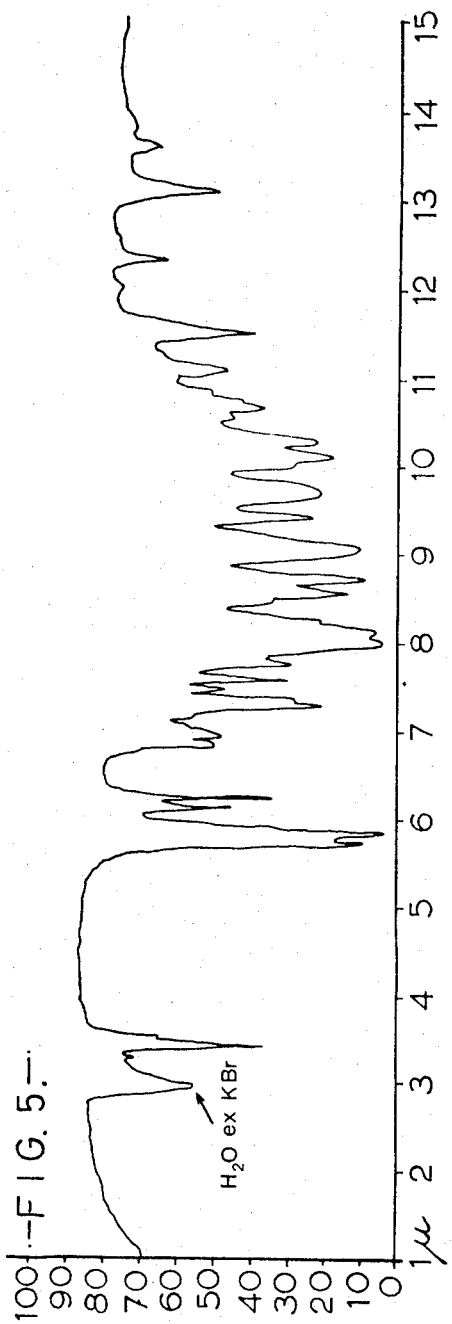
Figure 6:
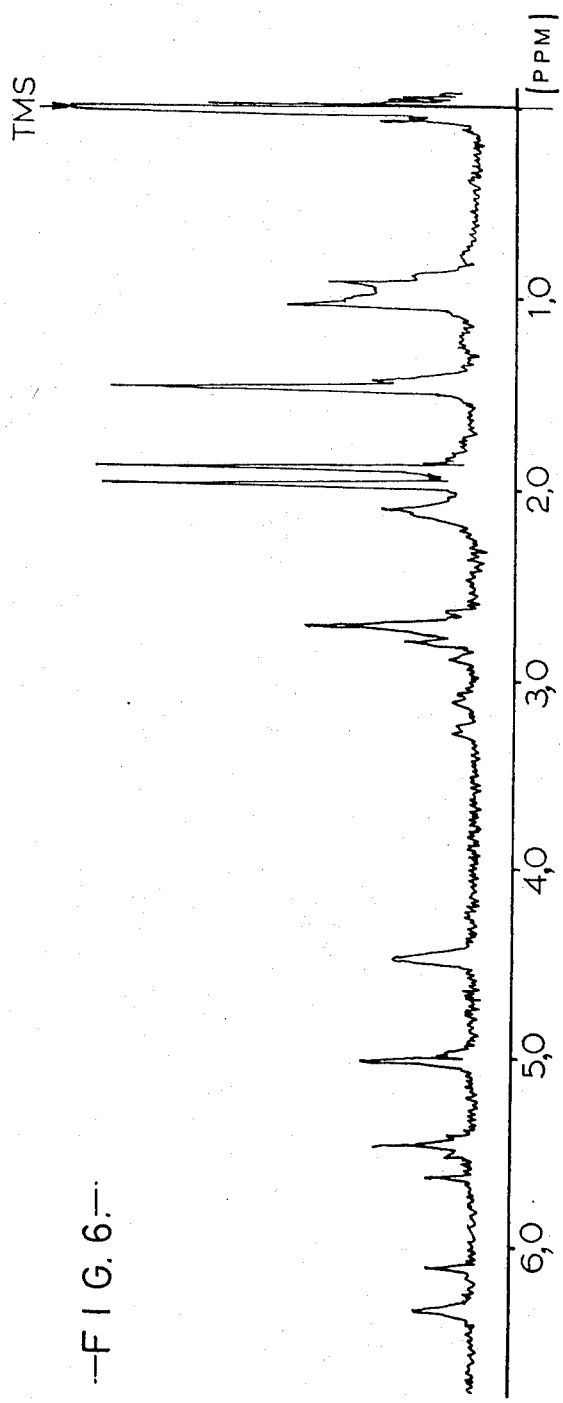

The ester of the empirical molecular formula $C_{24}H_{32}O_{10}$ has the same chromophore as the ester of formula $C_{22}H_{30}O_8$. It has a melting point of 83°– 84° C and an optical rotation of $[\alpha]_D^{24} = +163.7$ (in methanol). The extinction coefficient is 16,710 for the maximum at 256 mμ. The IR-spectrum and the NMR spectrum are represented by FIGS. 5 and 6.

Hydrolysis of the ester $C_{22}H_{30}O_8$ yields isovaleric acid, on the one hand, and an alcohol which resinifies under the conditions of hydrolysis and the structure of which has not yet been determined on the other hand.

Reaction of the new ester with a methanolic hydroxylamine solution yields hydroxamic acids of isovaleric acid and acetic acid, while the alcohol component resinifies the formation of hydroxamic acids has been proved by paper chromatography.

On careful pyrolysis at about 90° to about 110°C or on acid degradation, for instance, by allowing a solution of one part of the ester and five parts of trichloroacetic acid in chloroform to stand for a prolonged period of time, elimination of two isovaleric acids takes place. On chromatography of the de-acidified resinous residue on silica gel, a yellowish, crystalline compound of the formula $C_{12}H_{10}O_4$ and the melting point 108°C can be isolated. It contains an aldehyde group, in addition to an acetoxy group.

These reactions may also be used for characterizing the new ester.

It is, of course, understood that not only non-aqueous extracts obtained according to the invention can be subjected to the chromatographic absorption by partially inactivated alumina, silica gel and activated carbon, as described herein above, but also other non-aqueous extracts and crude ester preparations as they may be obtained according to other known methods.

The following examples serve to illustrate the present invention without, however, limiting the same thereto.

EXAMPLE 1

8 kg. of comminuted roots of Indian Valeriana are converted into a paste by means of a mixture of 14 l. of methanol and 0.14 l. of glacial acetic acid in a percolator. The resulting paste is allowed to stand for 20 hours. Percolation is then started. During percolation, a mixture of methanol and glacial acetic acid (in a ratio of 100:1, by volume,) is continuously added and the percolated liquid is continually concentrated by evaporation at a temperature below 30°C in a vertical (or climbing) film evaporator.

All in all 32.6 l. of methanol and 0.32 l. of glacial acetic acid are required for percolation which finally yields 4 l. of a concentrated extract. Said extract is mixed with 6 l. of water. The mixture is extracted four times by means of hexane whereby 2 l. of hexane are used each time. The aqueous layer is discarded. The combined hexane layers are freed of acid by a treatment with 2 l. of a 2 percent aqueous sodium hydroxide solution and are washed with a 5 percent sodium chloride solution until free of sodium hydroxide. The neutral hexane extract is treated with an equal volume of methanol containing acetic acid whereby no phase separation takes place. Only after addition of 0.3 l. of water a small upper layer is formed which is discarded as it does not contain the desired esters. 10 l. of a 5 percent sodium chloride solution are added to the lower phase which contains the isovaleric acid esters. Said layer is then extracted three times by means of hexane, each time by means of 2 l. of hexane. The combined hexane extracts (about 15 l.) are purified by means of charcoal, dried over sodium sulfate, and concentrated by evaporation in a vacuum at a temperature below 30°C. 0.195 kg. of a light yellow oil consisting of isovaleric acid esters is obtained thereby.

The milky and turbid aqueous methanol phase remaining after hexane extraction is subjected 5 times to further extraction with methylene chloride, each time with 2 l. of methylene chloride. The resulting clear, almost colorless, aqueous phase is discarded. The combined methylene chloride extracts are purified by means of charcoal and dried over sodium sulfate. On concentrating the methylene chloride extracts by distillation in a vacuum at a temperature below 30°C, 0.063 kg. of a yellow oil are obtained which also consists of isovaleric acid esters. The total yield is 0.258 kg. corresponding to 3.23 percent calculated for dry starting material.

EXAMPLE 2

1 kg. of freshly collected Valeriana roots of Frankonian origin are dried in a drier heated by circulating air at 35°C, comminuted and converted into a paste by means of 2 l. of a mixture of methanol and glacial acetic acid in the proportion of 100:1, by volume, in a percolator. The mixture is allowed to stand for 4 hours. Then percolation is started. Percolation is repeated three more times, each time by using 1 l. of the above mentioned methanol/glacial acetic mixture. The percolation time is 18, 24, and 6 hours, respectively.

3.5 l. of the combined percolated extracts are concentrated by evaporation to a volume of one-third of the starting volume in a vertical (or climbing) film evaporator at a temperature not exceeding 30°C. The concentrated extract is filtered. 2 l. of a 5 percent sodium chloride solution are added to the clear filtrate; the resulting mixture is extracted with benzene 5 times, each time with 0.5 l. of benzine. The combined benzine extracts are deacidified by a treatment with a 2 percent sodium hydroxide solution, washed with water, dried over sodium sulfate and concentrated by evaporation. The water-alcohol-glacial acetic acid phase is again extracted twice with methylene chloride, each time with 0.5 ml. of methylene chloride, then washed until free of acid, dried, and concentrated by evaporation.
Yields:
  Benzine phase 10.3 g.;
  Methylene chloride phase 3.1 g.;
Total yield:
  13.4 g. corresponding to 1.34 percent of the theoretical yield.

10.3 g. of the resulting yellowish oil containing the esters are dissolved in 0.2 l. of 90 percent acetic acid. The clear solution is extracted 3 times with benzine, each time with 0.05 l. of benzine. The combined benzine phases are shaken three times with 95 percent acetic acid, each time with 0.05 l. The benzine solutions worked up according to known methods contain essentially hydrocarbons, fats, and ethereal oils, while the desired isovaleric acid esters are present in the acetic acid solution. After addition of 0.740 l. of ice water, the acetic acid solution is extracted 6 times with benzine, each time with 0.40 l. of benzine. The combined benzine extracts are washed until free of acid reaction, dried over sodium sulfate and evaporated to dryness in a vacuum at 20°C.

A light-yellow oil is obtained which consists only of sedative and spasmolytic isovaleric acid esters. Yield of pure compounds: 3.4 g., corresponding to 0.34 percent of the theoretical yield.

EXAMPLE 3

100 parts, by volume, of water are added to 10 parts, by volume, of glacial acetic acid. The resulting solution is adjusted to a pH-value of 4.5 by the addition of ammonia. Equal parts, by volume, of acetic acid ethyl ester and ammonium acetate buffer solution are admixed thereto until saturation is achieved.

250 g. of comminuted Valeriana roots of Indian origin are converted into a paste by means of 400 ml. of the above described acetic acid ethyl ester mixture. The resulting paste is allowed to stand for 68½ hours at 22°C. Percolation is then started and continued in such a manner that all of said liquid percolating agent is percolated within 3½ hours. The percolation yields a first percolate of 460 ml., all together, with a pH-value of 3.5 to 4.0. Percolation is repeated with 200 ml. of acetic acid ethyl ester for 18 hours and the residue is washed with 100 ml. of acetic acid ethyl ester.

On repeating percolation for a third time, a percolate is obtained which practically does not contain any esters and, therefore, is discarded.

The combined first and second percolates yield 700 ml., while the total amount of solvent used for percolation is 1,100 ml.

Acetic acid ethyl ester is added to the combined percolates to yield 1,250 ml. The resulting solution is then shaken three times with a 5 percent sodium chloride solution saturated with butanol, each time with 650 ml. of said solution. The third extract has still a pH-value of 3.0. Therefore, a 1 percent sodium bicarbonate solution is added and the extract is again shaken. The water phase has then a pH of 5.0. The acetic acid ethyl ester phase is separated therefrom and dried over magnesium sulfate, filtered, and evaporated to dryness in a rotating evaporator at a bath temperature of 30° to 35°C in a vacuum. The yield of crude extract is 27.289 g., corresponding to 10.9 percent of the theoretical yield.

The crude extract is dissolved in 270 ml. of 90 percent acetic acid, subjected to extraction twice with benzine, each time with 75 ml. of benzine, and for two more times, each time with 50 ml. of benzine. The separated benzine phases are discarded. 540 ml. of ice water are added to the acetic acid phase and the solution is subjected to extraction four times with benzine, each time with 200 ml. The ester-containing benzine is deacidified by the addition of 200 ml. of a 5 percent sodium chloride solution saturated with butanol and additionally containing 1 percent of sodium bicarbonate. Should an emulsion be formed, deemulsification can be effected by the addition of a small amount of sodium chloride.

The ester-containing benzine phases are washed with 200 ml. of water each. The pH-value of the wash-water is 6.0. Magnesium sulfate and decolorizing carbon are added to the ester-containing benzine phase. The mixture is allowed to stand for some time and is filtered. The colorless filtrate is concentrated by evaporation in a vacuum at a temperature not exceeding 30°C until its weight remains constant. The yield of esters is 7.085 g., corresponding to 2.835 percent of the theoretical yield, related to the dried starting material.

EXAMPLE 4

250 g. of comminuted rhizomes of Valeriana plants of Indian origin are repeatedly percolated at 22°C with n-heptane containing 1 percent of propionic acid, each time with 500 ml. of said mixture, as described in the preceding examples. The percolation time is 94 hours. The combined extracts amount to 1,500 ml. The percolate is washed twice with water saturated with butanol and containing 5 percent of sodium chloride, each time with 600 ml. By using a sodium chloride solution saturated with butanol, formation of an emulsion is avoided and clear separation of the phases is achieved. The total percolate washed in this manner is dried over magnesium sulfate, filtered, and concentrated by evaporation in a vacuum at a bath temperature of 30°C until its weight remains constant.

Yield of crude material 11.03 g., corresponding to 4.41 percent.

11 g. of the crude ester oil are dissolved in 110 ml. of 90 percent acetic acid and subjected to extraction four times with benzine, saturated with 90 percent acetic acid, using 30 ml. of said benzine solution for each extraction. The benzine phases are discarded. 270 ml. of ice water are added to the resulting 135 ml. of acetic acid solution and the mixture is subjected to extraction four times with benzine, each time with 100 ml. thereof. The extraction temperature is 10°C. The combined, ester-containing benzine phases are deacidified by washing twice with water, each time with 200 ml. and subsequently with 200 ml. of butanol-saturated water which additionally contains 80 g. of sodium chloride and 4 g. of sodium bicarbonate. The thus purified and deacidified benzine phase is dried over magnesium sulfate and decolorized by the addition of 3 g. of charcoal. After filtration, the filtrate is concentrated by evaporation in a vacuum at a bath temperature of 30°C. until its weight remains constant. The liquid yield is 7.521 g. of a colorless ester mixture, corresponding to 3 percent of the theoretical yield related to a dried starting material.

EXAMPLE 5

250 g. of comminuted Valeriana roots of Indian origin are percolated with a mixture of acetone, potassium dihydrogen phosphate (Soerensen), and orthophosphoric acid (85 percent) in a proportion of 475 ml. : 25 ml. : 0.2 ml. The pH-value of the liquid is 4.55; the temperature is 22°C. The percolation time is 66.5 hours. After 1 more hour the paste is washed with 500 ml. of the above described solvent mixture and is then again subjected to percolation twice with the above described mixture for 22 hours, using 250 ml. thereof each time. The combined percolates and wash solutions amount to 1,030 ml. Said 1,030 ml. are concentrated by evaporation in a vacuum at a bath temperature of 35°C to a volume of 80 ml. About 240 ml. of water are added and the mixture is extracted with three successive 200 ml. portions of acetic acid ethyl ester and then with three 100 ml. portions of said ester.

The combined acetic acid ethyl ester extracts of a total volume of 910 ml. are shaken three times with 500 ml. portions of 5 percent aqueous sodium chloride solution previously saturated with butanol. The third wash water has a pH-value of 5.0.

The thus purified acetic acid ester extract is dried over magnesium sulfate at room temperature of 22°-24°C. After filtration the extract is concentrated by evaporation in a vacuum at a bath temperature of 35°C to constant weight. The yield of the resulting crude material is 28.0 g., corresponding to 11.2 percent of the theoretical yield.

The crude product is dissolved in 280 ml. of 90 percent acetic acid (10 times its amount) at a temperature not exceeding 10°C. The solution is subjected to extraction in a separating funnel twice with successive 90 ml. portions of pure benzine, and again twice with 60 ml. portions of benzine. The combined benzine extracts which do not contain therapeutically effective esters are discarded.

Twice the amount of water, that is, 840 ml., is added to the lower acetic acid layer at a temperature not exceeding 10°C. and the mixture is extracted 4 times with pure benzine, using 200 ml. of benzine each time. The combined benzine extracts are washed until acid-free, dried over magnesium sulfate, and filtered after addition of 3 g. of decolorizing carbon. The filtrate is concentrated by evaporation in a vacuum at a temperature not exceeeding 30°C to constant weight. The yield is 7.905 g. of a colorless, oily ester mixture, corresponding to 3.16 percent of the theoretical yield.

EXAMPLE 6

250 g. of comminuted Valeriana rhizomes of Indian origin are thoroughly mixed with 50 ml. of a 5 percent aqueous glycocol solution and 150 ml. of methanol. 500 ml. of tetrahydrofuran are added thereto in a percolator; the resulting mixture is allowed to stand at a temperature of 22°C for 70 hours. All the liquid is separated from the rhizomes and the residue is washed with further 300 ml. of tetrahydrofuran. The solvent used for washing and the percolate are combined to yield about 580 ml. of extract. The residue is again percolated with 500 ml. of the above described glycocol-methanol solution for 22 hours and the residue, after separation of the liquid, is washed with 200 ml. of tetrahydrofuran. 1,500 ml. of percolate and wash liquid are concentrated by evaporation in a vacuum at a bath temperature not exceeding 30°C to a volume of 200 ml. 400 ml. of water are added to the concentrated solution and the resulting mixture is subjected to extraction with six successive 100 ml. portions of benzine. Formation of an emulsion can be avoided by the addition of 40 g. of sodium chloride and a small amount of butanol. The washed extracts are dried over magnesium sulfate, filtered to clarify the same and concentrated by evaporation in a vacuum at a bath temperature of 30°C to constant weight.

The yield of crude material is 13.7 g., corresponding to 5.48 percent of the theoretical yield. The impurities are removed from said crude oil by means of 137 ml. of 95 percent acetic acid and by extracting with benzine using four successive 38 ml. portions thereof. To extract the esters, 354 ml. of ice water are added to the crude oil and the mixture is subjected to extraction with four successive 100 ml. portions of benzine. The yield is 6.865 g., corresponding to 2.74 percent of the theoretical yield.

EXAMPLE 7

250 g. of comminuted Valeriana roots of Indian origin are converted into a paste by means of 250 ml. of methylene chloride, to which 2.5 ml. of glacial acetic acid are added. The paste is covered in a percolator with further 150 ml. of methylene chloride containing 1 percent of glacial acetic acid. The mixture is allowed to stand for 68½ hours at a temperature of 21°C. Percolation is started and continued for 70 hours. During percolation methylene chloride containing 1 percent of glacial acetic acid is added in portions of 150 ml. each at equal intervals. The total percolate amounts to 800 ml. It is concentrated by evaporation in a vacuum at a bath temperature of 30°C to a viscous dark-brown extract. Said concentrate is dissolved in 500 ml. of acetic acid ethyl ester and filtered. The acetic acid ethyl ester solution is deacidified by washing it with two successive 250 ml. portions of a 5 percent sodium chloride solution saturated with butanol and, thereafter, with 250 ml. of 5 percent sodium chloride solution saturated with butanol and additionally containing 1 percent sodium bicarbonate. The pH-value of the last washing solution is 7.0. The acetic acid ethyl ester extract is then washed with two successive 250 ml. portions of a 5 percent sodium chloride solution, dried over magnesium sulfate, and concentrated by evaporation.

The yield is 18.1 g., corresponding to 7.25 percent of the theoretical yield.

This crude extract is dissolved in 180 ml. of 90 percent acetic acid, percolated to a temperature of 10°C., and subjected to extraction with two successive 60 ml. portions of benzine and then with two more successive 36 ml. portions of benzine. The combined benzine layers are shaken with 45 ml. of 90 percent acetic acid. The acetic acid layers amounting to 250 ml. are combined. Twice the amount of ice water is added thereto and the mixture is subjected to extraction with four successive 200 ml. portions of benzine. The combined benzine extracts are deacidified by washing twice with a 20 percent sodium chloride solution containing 1 percent of sodium bicarbonate, using 200 ml. of said solution each time. The washed solution is dried over magnesium sulfate with the addition of decolorizing carbon and concentrated by evaporation to constant weight. The yield is 6.84 g., corresponding to 2.73 percent of the theoretical yield.

EXAMPLE 8

100 g. of comminuted Valeriana roots of Indian origin are converted into a paste by means of 200 ml. of propionic acid (pH = 5, determined by means of LYPHAN pH-paper) in a percolator. The paste is allowed to stand for 70 hours. The percolate is drained off and 150 ml. of propionic acid are again added to the root powder. This operation is repeated 4 more times. The total percolate amounts to 520 ml. It is mixed with 520 ml. of benzine (boiling point 60° to 80°C). The mixture is allowed to stand at 22°C for 2 hours whereby a brown sediment precipitates. The clear benzine/propionic acid solution is removed by decanting, twice the amount, by volume, of ice water is added thereto, and the mixture is extracted by means of benzine. Extraction of the lower propionic acid layer is repeated twice by adding ice water using 500 ml. of ice water each time, extracting the ice water mixture with benzine, using 200 ml. of benzine each time. The combined benzine phases are deacidified by washing as described in the preceding examples and are concentrated by evaporation in a vacuum. The yield is 3.723 g., corresponding to 3.7 percent of the theoretical yield. This concentrate is worked up to the pure ester mixture according to the preceding examples.

The yield of an almost colorless, oily ester mixture is 1.89 percent of the theoretical yield.

As stated above, the new isovaleric acid esters recovered and isolated according to the present invention have a noteworthy sedative and spasmolytic activity and thus are of value in therapy.

As stated hereinabove, there may be used, in place of the solvents employed in the preceding examples, other lipophilic solvents, such as aliphatic hydrocarbons, preferably those boiling between 50° and 125°C; aromatic hydrocarbons, preferably those boiling between 80° and 200°C; liquid chloro, bromo, and/or fluoro substituted aliphatic hydrocarbons, preferably those with one to three carbon atoms; aliphatic ethers, preferably those boiling between 35° and 100°C; aliphatic esters, preferably those boiling between 77° and 125°C; aliphatic ketones, preferably those boiling between 56° and 125°C; aliphatic alcohols, preferably those boiling between 65° and 150°C and the like.

In place of carboxylic acids to be added to the lipophilic solvents, there may be used other acidic agents which are soluble therein. It is also possible to use methanol, ethanol, acetic acid ethyl ester, and the like solvents which have been adjusted to a pH-value between about 4.0 and about 5.0, for instance, by means of a suitable acidic phosphate buffer compound or, respectively, composition which is soluble therein. When using alkali metal or ammonium salts of the acidic agents such as the above-mentioned carboxylic acids, solvents are employed in which such salts are soluble.

Extraction with the acidic agents alone, that is, without solvents, is carried out in the absence of water, that is, with substantially anhydrous carboxylic acids and the like. No more than about 10 percent of water should be present in the extracting solvent.

EXAMPLE 9

550 g. of alumina (activity: III according to Brockmann) are suspended in a mixture of 600 cc. of n-heptane and 30 cc. of glacial acetic acid in an Erlenmeyer flask while gently agitating. Thereby, the temperature of the mixture increases to about 30°C. The mixture is allowed to stand at 20°C for 24 hours and is then filled into a glass column of 700 mm. height and 30 mm. diameter. The alumina column is washed with n-heptane until the wash liquid indicates a pH-value of 4.5, proved by means of a moistened pH-paper.

5 g. of the crude light yellow esters obtained by methanol extraction of roots and rhizomes of Indian Valeriana plants accordng to Example 1 as shown above are dissolved in 5 cc. of n-heptane. The heptane solution is applied to an alumina column preprepared as described above. The column is then eluted by means of n-heptane. The elution speed is 40 drops per minute. 100 fractions of 50 cc. each are collected. The isolated fractions are subjected to thin-layer chromatography to determine the sedatively effective fractions.

The components of fractions 0 to 24 have no sedative activity in animals. The fractions 25 to 60 contain 1.4925 g., corresponding to 29.85 percent of the theoretical yield, of a chromatographically uniform component which shows strong sedative activity in animals.

The empirical molecular formula of the compound isolated from said fractions 25 – 60 is:

$$C_{22}H_{30}O_8$$

| Molecular weight: (determined cryoscopically benzene) | Calculated: | 422.46; |
| --- | --- | --- |
|  | Found: | 429.0 ; |
| Analysis: | Calculated: | 62.54% C; |
|  | Found: | 62.76% C. |
|  | Calculated: | 7.15% H; |
|  | Found: | 7.32% H. |
|  | Calculated: | 30.31% O; |
|  | Found: | 29.92% O. |

Optical rotation:
$[\alpha]_D^{28} = +178°$ (in benzene; concentration 1.089% and 1 = 1 dm.)
$[\alpha]_D^{28} = +167°$ (in methanol; concentration 1.035% and 1 = 1 dm.)
Refractive index is:
$n_D^{20} = 1.4906$.
Ultraviolet spectrum:
$max_1 = 256$ m/$\mu$ ($\epsilon = 16,050$) in methanol
$max_2 = 204$ m/$\mu$ ($\epsilon = 4,000$) in methanol.
FIG. 1 illustrates the infrared spectrum of the new ester obtained by chromatography according to the present invention and FIG. 2 illustrates its nuclear magnetic resonance spectrum.

EXAMPLE 10

300 g. of alumina (activity: I according to Brockmann) are inactivated by a treatment with 15 cc. of glacial acetic acid and 300 cc. of n-heptane by following the procedure described in Example 9. The inactivated alumina is filled into a glass column of 30 mm. diameter and 700 mm. height. 2,500 cc. of a mixture of 85 parts, by volume, of n-heptane and 15 parts, by volume, of ethyl methyl ketone are used to remove excess acetic acid by washing. Thereafter, the column has a pH of 4.0 to 4.5.

2.1 g. of the light-yellow, oily isovaleric acid ester mixture obtained by extracting roots and rhizomes of Valeriana plants according to example 2 as shown above are dissolved in 2.1 cc. of a mixture of n-heptane and ethyl methyl ketone (85:15). The solution is poured onto the above-mentioned partly inactivated alumina column. Elution is carried out by passing a mixture of n-heptane and ethyl methyl ketone (85:15) through said column at an elution speed of 30 drops per minute and at a temperature of 20°C. After a first run of 500 cc. is separated and discarded, 30 fractions of 20 cc. each are collected. The sedative ester is predominately contained in the first 3 to 5 fractions of said 30 fractions. These fractions 3 to 5 are combined, deacidified by treatment with a 5 percent sodium bicarbonate solution, washed with water, dried over magnesium sulfate, and evaporated in a vacuum at a temperature of 30°C. The yield is 0.900 g, corresponding to 42.0 percent of the pure ester of the empirical molecular formula of $C_{22}H_{30}O_8$.

Optical rotation, refractive index, molecular weight, ultraviolet spectrum, infrared spectrum, and nuclear magnetic resonance spectrum correspond to those determined for the ester of Example 9.

ISOLATION OF THE INDIVIDUAL ESTERS FROM THE ESTER MIXTURE

EXAMPLE 11

529 g fresh roots, rhizomes and stalks of a Centranthus ruber DC plant were percolated with acetic acid ethyl acetate, containing 1 percent acetic acid at 21° C until 3 l of total percolate was obtained. After washing the percolate with 2% $K_2CO_3$ solution and water until it showed a neutral reaction and after subsequent drying the percolate was concentrated in a vacuum at 35° C to constant weight. 6.06 g of a yellowish brown oil were obtained, i.e., 1.15 percent of the fresh raw material or 4.56 percent based on the dry weight. This oil contained about 67 percent of the ester $C_{22}H_{30}O_8$, about 3.0 percent of the ester $C_{22}H_{32}O_8$ and about 5 percent of the ester $C_{24}H_{32}O_{10}$.

For the separation of the three esters from each other, the 6.06 g oil were dissolved in a mixture of 10 ml ethyl methyl ketone and 5 ml n-hexane and applied to a chromatographic column of 600 g aluminum oxide, which had been partly inactivated by the following treatment:

600 g aluminum oxide Woelm (activity grade I) were suspended under stirring in a mixture of 300 ml n-hexane, 11 ml propionic acid, 5 ml acetic acid, 80 ml glycerine monoacetate and 60 ml ethyl methyl ketone. After filling into the column the thus treated aluminum oxide was washed with about 2.5 l n-hexane.

The elution of the esters was effected with n-hexane. The first 500 ml eluate were discarded. Then 204 fractions of 20 ml each were gathered. Fractions 18 – 55 contained the ester $C_{22}H_{30}O_8$, the fractions 56 – 83 contained the ester $C_{22}H_{32}O_8$, and the residual fractions contained the ester $C_{24}H_{32}O_{10}$.

EXAMPLE 12

3,000 g of alumina (activity: I according to Brockmann) are suspended in a mixture of 2,400 cc. of acetone, 600 cc. of glycerol monoacetate, and 12 cc. of glacial acetic acid. The suspension is slowly filled into a glass column of 100 mm diameter and 1,200 mm height, thereby avoiding air bubble formation.

After the alumina has settled uniformly and the heat of reaction of the alumina with the solvent mixture has subsided, the solvent is discharged from the column and the alumina is washed with n-heptane. Washing is continued until, the volume of the recovered wash eluate remains constant on shaking with an equal volume of water and the aqueous layer has a $p_H$ of 4.0 to 5.0.

150 g. of an ester mixture extracted from Indian Valeriana roots according to Example 3 as shown above are dissolved in 150 cc. of n-heptane. The solution is poured onto the alumina column prepared as described above. After the solution has been completely adsorbed, elution by means of n-hexane is started. The collected eluate fractions are tested for the active ester by thin-layer chromatography. The fractions containing the active component are combined, deacidified by washing with water and 1 percent sodium carbonate solution, decolorized by treatment with animal charcoal, and dried over magnesium sulfate. 43.2 g. of the pure ester, corresponding to 28.8 percent of the theoretical yield, are obtained from the concentrated pure fractions in the form of a colorless highly viscous oil.

Optical rotation, refractive index, molecular weight, ultraviolet, infrared and nuclear magnetic resonance spectra are the same as those determined with the ester of Example 9.

EXAMPLE 13

3,000 g. of alumina (activity: I according to Brockmann) are partly inactivated by proceeding in the same manner as described in Example 12. However, in contrast to said example, the column is washed with benzine (b.p.: 50°–75°C), in place of n-heptane, until the volume of the resulting wash eluate remains constant on shaking with an equal volume of water and the aqueous layer shows a pH of 4.0 to 5.0. 150 g. of the same starting ester mixture as used in Example 12 are dissolved in 150 cc. of benzine and the solution is applied to the above-described column. As soon as the benzine solution has been adsorbed, elution by means of benzine is started. The collected eluate fractions are tested for the new ester by thin-layer chromatography. All the fractions containing the pure active ester are combined, deacidified by washing with water and a 1 percent sodium bicarbonate solution, decolorized by treatment with animal charcoal, and dried over magnesium sulfate. 39.5 g. of the pure ester, corresponding to 26.2 percent of the theoretical yield, are obtained from the concentrated pure eluate fractions in the form of a colorless oil.

Optical rotation, refractive index, molecular weight, ultraviolet, infrared, and nulclear magnetic resonance spectra correspond to those shown by the ester of Example 9.

EXAMPLE 14

500 g. of alumina (activity: I according to Brockmann) are suspended in a mixture of 400 cc. of amyl acetate, 100 cc. of glycerol mono-acetate, and 2 cc. of glacial acetic acid. The suspension is slowly filled into a glass column of 30 mm. diameter and 800 mm. height thereby avoiding formation of air bubbles.

After uniform settling of the alumina in the glass column and dying off of the positive heat of reaction of the alumina with the solvent mixture, the solvent mixture is slowly discharged. The resulting alumina column is washed with n-heptane until the volume of the eluate remains constant on shaking with an equal amount of water and the aqueous layer shows a pH of 4.0 to 5.0.

5 g. of the ester mixture used in Example 12 are dissolved in 5 cc. of a mixture of 9 parts, by volume, of n-heptane, and 1 part, by volume, of amyl acetate. The solution is applied to the above described alumina column. After the solution has been completely adsorbed, the column is eluted by means of n-heptane. The collected eluate fractions are tested for the sedative ester as described in Example 13.

All fractions containing the active ester are combined, deacidified by washing with water and 1 percent sodium bicarbonate solution, decolorized by treatment with animal charcoal, and dried over magnesium sulfate. 1.46 g. of the pure ester, corresponding to 29.2 percent of the theoretical yield, are obtained from the concentrated eluate fractions. Optical rotation, refractive index, molecular weight, ultraviolet, infrared, and nuclear magnetic resonance spectra of said ester correspond to those shown by the ester of Example 9.

EXAMPLE 15

1500 g. of alumina (activity: I according to Brockmann) are slowly suspended in a mixture of 570 cc. of dioxane, 250 cc. of glycerol mono-acetate, 250 cc. of hexane, and 80 cc. of glacial acetic acid while stirring. After disappearance of the positive heat of reaction, the suspension is filled into a glass column of 40 mm. diameter and 1,400 mm. height, the solvent mixture is discharged, and the column is washed with n-hexane. Washing with hexane is continued until the volume of the resulting wash eluate remains constant on shaking with an equal volume of water and aqueous layer has a pH of 4.0 to 5.0.

22.3 g. of an isovaleric acid ester mixture obtained by extracting Indian Valeriana roots according to Example 5 as shown above are dissolved in a mixture of 17 cc. of n-hexane and 3 cc. of dioxane. The solution is applied to the above described alumina column. After the solution has been completely adsorbed, the column is eluted with n-hexane. The collected eluate fractions are tested for the active ester as described in Example 13.

All eluate fractions containing the pure, active ester are combined, de-acidified by washing with water and 1 percent sodium bicarbonate solution, decolorized by treatment with animal charcoal, and dried over magnesium sulfate. 13.95 g. of the pure ester, corresponding to 60.0 percent of the theoretical yield, are obtained. Optical rotation, refractive index, molecular weight, ultraviolet, infrared, and nuclear magnetic resonance spectra correspond to those shown by the ester of Example 9.

EXAMPLE 16

500 g. of alumina (activity: I according to Brockmann) are slowly suspended in a mixture of 400 cc. of acetone, 100 cc. of glycerol mono-acetate, and 20 cc. of n-butyric acid, while stirring. After the positive heat of reaction has disappeared, the suspension is filled into a glass column of 30 mm. diameter and 1,000 mm. height, the solvent mixture is drained off, and the alumina is washed with n-hexane. Washing with hexane is continued until the volume of the resulting wash eluate remains constant on shaking with an equal amount of water and the aqueous layer has a pH of 4.0 to 5.0. 6.3 g. of an isovaleric acid ester mixture obtained by extracting Indian Valeriana roots according to Example 4 as shown below are dissolved in 20 cc. of n-hexane. The solution is poured onto the above described alumina column. After adsorption of the solution is completed, the column is eluted with n-hexane. The collected eluate fractions are tested for the active ester as described in Example 13.

All fractions containing the pure active ester are combined, de-acidified by washing with water and 1 percent sodium hydroxide solution, shaken with phosphate buffer of a pH-value of 4.9 according to Soerrensen, decolorized by treatment with animal charcoal, and dried over magnesium sulfate. 2.0 g. of the pure ester, corresponding to 31.7 percent of the theoretical yield, are obtained from the concentrated pure fractions.

Optical rotation, refractive index, molecular weight, ultraviolet, infrared, and nuclear magnetic resonance spectra correspond to those of the ester of Example 9.

EXAMPLE 17

300 g. of alumina (activity: I according to Brockmann) are slowly suspended in a mixture of 240 cc. of acetone, 60 cc. of glycerol mono-acetate, and 6 cc. of propionic acid while stirring. After disappearance of the positive heat of reaction, the suspension is filled into a glass column of 30 mm. diameter and 500 mm. height, the solvent is drained off, and the resulting alumina column is washed with n-hexane until the volume of the wash eluate remains constant on shaking with an equal amount of water and the aqueous layer has a pH of 4.0 to 5.0.

3 g. of the isovaleric acid ester mixture obtained by extracting Indian Valerina roots according to Example 7 as shown above are dissolved in 10 cc. of n-hexane. The solution is poured onto the above described alumina column. After complete adsorption of the solution, the column is eluted with n-hexane. The collected eluate fractions are tested for the active ester as described in Example 13.

All fractions containing the active ester are combined, de-acidified by washing once with a 1 percent sodium hydroxide solution, twice with water, and once with a potassium hydrogen phosphate solution of a pH-value of 4.9 according to Soerrensen. The washed fractions are then decolorized by treatment with animal charcoal and are dried over magnesium sulfate. 0.9099 g. of the pure ester, corresponding to 30.33 percent of the theoretical yield, are obtained from the concentrated fractions.

Optical rotation, refractive index, molecular weight, ultraviolet, infrared, and nuclear magnetic resonance spectra correspond to those of Example 9.

The alumina used in the preceding examples is chromatographic alumina, standardized according to the method of Brockmann. (See, for instance, the basic publication of Brockmann in "Ber. Deutsch, Chem. Ges." 1941, pg. 73). A rapid method to determine the activity of alumina is described in: "Chemiker-Zeitung" vol. 85, pg. 374, (1961).

Of course, many changes and variations in the starting materials and extracted ester mixtures, the partial inactivation of alumina, the solvents used, the eluting conditions, in the method of working up, isolating, and purifying the eluted ester and the like, may be made by those skilled in the art in accordance with the principles set forth herein and the claims annexed hereto.

The following non-limiting examples of the invention illustrate isolation and separation of the component esters of the isovaleric acid esters contained in the oily mixture obtained by the methods described above.

EXAMPLE 18
Isolation of $C_{22}H_{30}O_8$

There were extracted 60 kg. of ground Valeriana roots by percolating through the mass acetic acid ethyl ester which contains 1 percent acetic acid, until a total of 190 liters of percolate were obtained. This liquid was then washed portion-wise with a 3 percent sodium bicarbonate solution, and a 5 percent sodium chloride solution, decolorized with charcoal, dried over sodium sulfate and concentrated at 30°C to a constant weight. The yield of the highly viscous, yellow colored, crude ester mixture was 3.15 kg. or 5.25 percent.

To separate the isovaleric acid esters from other undesirable accompanying substances, the 3.15 kg. of crude ester mixture was dissolved in 18 liters of 90 percent acetic acid at 10°C and the solution was then extracted three times with each 5 liters of benzine (a mixture of aliphatic hydrocarbons of boiling range of 70° to 90°C), which was saturated with 90 percent acetic acid. Afterwords, the acetic acid phase was diluted with one and a half times its volume of water and then extracted 6 times each with 15 liters of benzine.

The combined ester-containing benzine phases were then washed free of acid with a 0.25 percent sodium hydroxide solution, dried over sodium sulfate, decolorized with charcoal, and concentrated in vacuum at 30°C to a constant weight. The yield of purified light yellow colored ester oil was 0.7726 kg. of 1.29 percent based on the dried drug.

After inactivation of 5 kg. aluminum oxide by treatment with a mixture of 4,000 cc. of acetone, 1,000 cc. of glycerol mono-acetate, and 200 cc. of propionic acid, the aluminum oxide were placed into a column and washed with 4,000 cc. of hexane. Thereafter, 0.25 kg. of the light yellow colored ester oil diluted in 50 ml. of hexane were placed on the column. The elution was carried out with a total of 20 liters of hexane. The first three liters of the eluate were discarded. The following 10 liters contained the ester with the empirical formula $C_{22}H_{30}O_8$.

This fraction was concentrated by evaporation, washed free of acid with sodium hydroxide and water, and dried over sodium sulfate and charcoal. After concentrating in vacuum, 0.0935 kg. of pure ester $C_{22}H_{30}O_8$ (37.4 percent of the oil) resulted.

The ester was further identified by molecular weight determined cryoscopically in benzene. The following values were obtained.

| | |
|---|---|
| Molecular weight calculated: | 422.46 |
| Molecular weight found: | 422.0 |
| Analysis: calculated: | 62.54% C; 7.15% H; 30.31% O |
| found: | 62.76% C; 7.32% H; 29.92% O |
| Ultraviolet spectrum: | $\lambda max_1$=204m, $\epsilon$=4000 in methanol |
| | $\lambda max_2$=256 m, $\epsilon$=16050 in methanol |

Refractive index: $n_D^{20} = 1.4906$
Optical rotation: $[\alpha]_D^{21} = +172.2°$ (in methanol)
FIG. 1 illustrates the infra-red spectrum and FIG. 2 illustrates the NMR spectrum of $C_{22}H_{30}O_8$.

Isolation of $C_{22}H_{32}O_8$

From the following fraction of a total of 2 liters, 2.7 g. of the esters $C_{22}H_{32}O_8$ were isolated by means of an analogous procedure as described above. After a recrystallization from a mixture of ether and hexane (1

: 9 ), the ester was found to have the following properties:

m.p. 62°–63° C (Kofler): $[\alpha]_D^{20} = -79°$ (in methanol)

Molecular weight calculated:  424.5
Molecular weight found:  413.0
Analysis: Calculated:  62.24 % C; 7.59 % H; 30.17 % O
found:  62.21 % C; 7.55 % H; 30.24 % O $\lambda$ max = 214 – 216 m (dependent on concentration) (in methanol)

FIG. 3 illustrates the IR-spectrum and FIG. 4 illustrates the NMR spectrum of $C_{22}H_{30}O_8$.

Isolation of $C_{24}H_{32}O_{10}$

For the extraction of the ester $C_{24}H_{32}O_{10}$, 5 – 10 percent acetone was added to the hexane, and the resulting extract was concentrated in vacuum to a constant weight. The product was 30 g. of a crystallisate. After recrystallization from a mixture of ether/petroleum ether (1:9) the ester was found to have the following properties:

m.p. 83°–84°C. (Kofler)

Molecular weight calculated  480.52
Molecular weight found:  442.00
Analysis: calculated:  59.99% C; 6.71% H; 33.30% O
found:  59.52% C; 6.79% H; 33.83% O $[\alpha]_D^{24} = +163.7$ (in methanol)
$\lambda max_1 = 204\ m$ ($\epsilon = 4,000$) (in methanol)
$\lambda max_2 = 256\ m$ ($\epsilon = 16,710$) (in methanol)

FIG. 5 illustrates the IR-spectrum and FIG. 6 illustrates the NMR spectrum of $C_{24}H_{32}O_{10}$.

EXAMPLE 19

The ester $C_{22}H_{32}O_8$ is prepared from rhizomes of Valeriana wallichii D.C., without column chromatography, as follows. There are extracted 60 kg. of ground rhizomes by percolating through the mass acetic acid ethyl ester which contained 1 percent of isovaleric acid. The percolate was washed twice till free of acid with a 0.25% NaOH-solution, dried over sodium sulfate, clarified with charcoal and concentrated to a constant weight in vacuum, at a temperature of 30°C. The yield was 4,602 kg. or 7.7 percent of crude, light brown colored ester oil.

Each portion of 2.3 kg. of crude ester oil was dissolved in 13.8 liters of a 90 percent acetic acid, and shaken once with four liters and twice with three liters of benzine saturated with a 90 percent acetic acid. The acetic acid phases were then mixed with ice water in an amount of one and half times volume, and each stirred 4 times each with 10 liters benzine. The benzine phases were washed free of acid each with four times 10 liters of 0.25 percent sodium hydroxide solution which contained 0.5 percent of sodium chloride, dried over sodium sulfate, decolorized with charcoal and concentrated at 30°C to a constant weight.

The yield was 1.463 kg. of purified ester oil, equal to 2.44 percent, based on the dried drug. The oil crystallized after standing for several days. After a re-crystallization from ether/hexane white needles of a melting point of 58°–62°C were obtained. For analysis, a further recrystallization from ether/hexane was carried out, yielding a product of a melting point of 62°–63°C. The analysis agress in all respects with the results of those of Example 18 for the ester of formula $C_{22}H_{32}O_8$.

EXAMPLE 20

10 g. of activated carbon are suspended in 50 cc. of methanol. The suspension is filled into a column of a diameter of 20 mm. and a height of 300 mm. 1 g. of a concentrated viscous acetic acid ethyl ester raw extract obtained from the rhizomes of the plant Valeriana wallichii D. C. is dissolved in 10 cc. of 95 percent methanol. The solution is placed on the column and is adsorbed on the activated carbon (Carboraffin R, sold by the Firm Lurgi, West Germany). Thereafter, 500 cc. of 95 percent methanol are passed through the column under a pressure of 2 atm. gauge. so as to cause desorption. Fractions of 25 cc of eluate are collected. Thin-layer chromatography shows that the isovaleric acid ester of the empirical formula $C_{22}H_{32}O_8$ is present almost quantitatively in fractions 6 to 20. Said fractions are evaporated to dryness at 30°C in a vacuum. 0.43 g of a crystalline product are obtained, that is, 43 percent of the total extract adsorbed. On recrystallization from a mixture of ether and petroleum ether (1 : 9), there are obtained 0.27 g. of the ester of formula $C_{22}H_{32}O_8$ with the melting point of 61°C. The yield is 27 percent of the starting extract subjected to adsorption and desorption.

EXAMPLE 21

10 g. of activated carbon are suspended in 50 cc. of a mixture of methanol and chloroform (9:1, by volume). The suspension is filled into a column of a diameter of 20 mm. and a height of 300 mm. 1 g. of a concentrated viscous acetic acid ethyl ester raw extract obtained from Radix Valeriana, that is, the dried rhizomes and roots of Valeriana officinalis is dissolved in 10 cc. of a mixture of methanol and chloroform of the same composition. The solution is placed on the column and is adsorbed on the activated carbon. Thereafter, desorption is effected by passing a solvent mixture of the same composition through the column under a pressure of 2 atm. gauge. After collecting only about 100 cc. of the eluate, containing the not desired accompanying substances, the residual fractions containing the isovaleric acid esters of the empirical formulas $C_{22}H_{32}O_8$, $C_{22}H_{30}O_8$, and $C_{24}H_{32}O_{10}$ are quantitatively eluted. After concentration in a vacuum 0.472 g. of an oily ester mixture are obtained as residue. Said mixture is dissolved in the double volume of carbon tetrachloride and subjected to chromatographic adsorption on activated carbon. On elution with carbon tetrachloride, as described above there are obtained 0.24 g. of the isovaleric acid ester of the formula $C_{22}H_{32}O_8$ and the melting point of 58°C.

EXAMPLE 22

10 g. of activated carbon are suspended in 50 cc. of ethanol. The suspension is filled into a column. 1 g. of a raw extract obtained by extracting the dried rhizomes and roots of Valeriana officinalis is dissolved in the threefold amount by volume of ethanol, placed on the activated carbon column and adsorbed thereon. Elution is effected by passing 95 percent ethanol under a slight pressure through the column in such a manner that 1 cc. of eluate is obtained per minute. The first 90 cc. of eluate collected contain 0.48 g. of ethereal oils and degradation products of the isovaleric acid esters. On concentration of the following 200 cc. of eluate, there are obtained 0.69 g. of a mixture of about equal parts of isovaleric acid esters of the formulas $C_{22}H_{32}O_8$, $C_{22}H_{30}O_8$, $C_{24}H_{32}O_{10}$ in the form of a colorless oil.

EXAMPLE 23

10 g. of activated carbon are suspended in 50 cc. of benzine, that is, a mixture of aliphatic hydrocarbons boiling between 70° and 90°C. The suspension is filled into a column of a diameter of 20 mm. and a height of 300 mm. 1 g. of a concentrated viscous acetic acid ethyl ester raw extract obtained from the rhizomes of *Valeriana wallichii* is dissolved in 10 cc. of carbon tetrachloride. The solution is placed on the column and is adsorbed on the activated carbon. Thereafter, desorption is effected by passing carbon tetrachloride through the column under a pressure of 2 atm. gauge. On collecting about 200 cc. of carbon tetrachloride eluate and concentrating the eluate in a vacuum, there are obtained 0.47 g. of a colorless oil which consists of the isovaleric acid esters of the formulas $C_{22}H_{30}O_8$, $C_{22}H_{32}O_8$, and $C_{24}H_{32}O_{10}$ in the proportion of 1:8:1. On recrystallization of said oil from a mixture of ether and petroleum ether (1:9), there are obtained 0.235 g. of the ester of the formula $C_{22}H_{32}O_8$ of the melting point of 59°C.

EXAMPLE 24

25 g. of silica gel (silica gel for chromatography, sold by the firm Merck, West Germany) of a particle size smaller than 0.08 mm. are suspended in 100 cc. of benzine and filled into a column of a diameter of 20 mm. and a height of 300 mm. 2.5 g. of an acetic acid ethyl ester raw extract obtained from the dried rhizomes and roots of *Valeriana officinalis* are diluted with 2.5 cc. of chloroform. Said mixture is placed on the column and is adsorbed on the silica gel. Elution is effected by passing 250 cc. of chloroform at about 2 atm. gauge. The first 20 cc. of eluate collected contain mainly ethereal oils and are discarded. The following 75 cc. of eluate contain the ester of the formula $C_{22}H_{32}O_8$. After concentration of the eluate in a vacuum, a yellow oil is obtained. It is dissolved in a mixture of ether and petroleum ether (1:9) and decolorized by a treatment with charcoal. 0.45 g. of the isovaleric acid ester of the formula $C_{22}H_{32}O_8$ and the melting point of 60°C are obtained.

Pharmacological properties of the isovaleric acid esters of the invention are described below.

The following phamacological tests were carried out with the isolated isovaleric acid ester $C_{22}H_{30}O_8$ according to the present invention: The acute toxicity and activity were determined on white mice; the activity was determined on rats; the effect of the new ester on the mobility of white mice was determined in the vibrating cage test; the effect on administration in combination with hexobarbital was determined; the effect on blood pressure and systemic reactions was determined on rats.

These tests showed that the isovaleric acid ester of the formula $C_{22}H_{30}O_8$ as obtained according to the present invention is a highly effective sedative component of plants of the genus Valeriana. It has a sedative activity whose effect is rapidly observed and felt and wears off within a relatively short time. Its toxicity is extremely low. Oral administration is especially desirable in that respect. Tests for semichronic toxicity do not indicate any cumulative effect or toxic effects of the metabolism.

Tests on humans have shown that the new isovaleric acid ester apparently is more effective on females than on males. This is a valuable selectivity. For instance, 20 mg. of the ester were administered daily to 16 females and 16 males. Likewise, the same amount of placebos were administered to the same test persons in permuted order. The administered isovaleric acid ester caused marked improvement of the productive power or efficiency of neurotic tested individuals.

None of the tested individuals showed discomfort, none had any other subjective complaints. Thus, the isovaleric acid ester, according to the present invention, exhibits, on oral administration of a dose of 20 mg., tranquilizing effect on the psychomotor activity and reactivity.

Pharmacological tests were carried out with $C_{22}H_{32}O_8$ and $C_{24}H_{32}O_{10}$, as described below, with mice, rats and human subjects.

In animal tests the isovaleric acid ester showed a low toxicity degree. The isovaleric acid esters $C_{22}H_{32}O_8$ and $C_{24}H_{32}O_{10}$ have a sedative effect which brings about a measurable improvement of motor restlessness. Undesirable side effects were not observed in the course of the animal tests. Further results are discussed below.

The pharmacological tests which were carried out with the isovaleric acid esters yielded the following results:

```
Acute Toxicity:
White Mice
LD 50 intraperitonal        70 mg/kg
LD 50 oral                7500 mg/kg
Rats
LD 50 intraperitonal        65 mg/kg
Subacute Toxicity:
Histology:
```

The test animals as well as the control animals were subjected to examinations of liver, lung, lier, kidney, pancreas, intestines, thyroid, ovaries, and testicles, respectively. The test animals being compared to the control animals showed no changes of the organs. Especially noteworthy is that in histological tests toxic effects on the organs were not observed.

Semi-chronic toxicity tests in rats:

After a daily oral administration of 250 mg/kg for a period of 2 weeks no toxic effect could be observed. The development of the animals and autopsy findings were all normal.

Effect on animals:

The active agents have been tested as to their sedative effect on white mice in tremor cages and on rats in tremor cages and labyrinths. In the afore-mentioned tests the substances show a clear sedative effect, thus causing an improvement of motoric restlessness. Incoordination or narcotic (hypnotic) effects were not observed.

There were not observed any effects on the regular circulation mechanism of dogs.

Observations and Conclusions:

$C_{22}H_{32}O_8$ is a sedative, its activity setting in within a relatively short time and fading relatively soon thereafter. The toxicity degree of the substance is, especially, when orally administered, extremely low. The pharmological tests did not indicate any cumulative effect or toxic effects on metabolism. The same applies to $C_{24}H_{32}O_{10}$: with that ester, however, a longer lasting sedative effect was observed.

Result of clinical tests:

Clinical trials with $C_{22}H_{32}O_8$ have been carried out in 1,420 cases. The individual doses are 20 or 50 mg, daily doses being between 60 mg and 300 mg. The results were good to very good in 814 cases (=57 percent), medium to sufficient in 387 cases (= 28 percent), and not sufficient in 219 cases (= 15 percent).

$C_{22}H_{32}O_8$ has been clinically tested under many different therapeutic conditions. Results were obtained from free established neurologists, from internists of general hospitals, from medical and neurological university hospitals, from mental homes, and from various sanatoria, especially for patients suffering from carcinoma. In most cases, the physician indicates a medium calming effect as being the main therapeutic property which — also in cases of higher doses - did not result in hypnotic side-effects. A steady and harmonized disposition is reached. patients suffering from general and motoric restlessness calm down and become more adaptive. This mainly applies to restless cerebral sclerosis patients during the night. Conditions of restlessness occurring with patients suffering from hyperthyreosis and lasting after strumectomy were treated with success. After treatment with psychotropic substances the remaining restlessness was favorably influenced by $C_{22}H_{32}O_8$. The doses of psychotropic substances could be reduced to a certain degree under simultaneous administration of $C_{22}H_{32}O_8$. On patients showing nervous hyperexcitability and slight depression, above all in connection with malign diseases, the substance has an excellent calming effect during the treatment of the patients after operations or ray-therapy in special sanatoria. To a certain extent a state of euphoria was reached in some cases so that all negative reflections on the importance of the disease disappeared. In such cases $C_{22}H_{32}O_8$ also proved to be suitable as a night sedative so that administration of hypnotics became unnecessary.

Special psychological tests clearly showed a sedative influence which set in about 20 to 30 minutes after oral administration of the usual dose. During the psychological tests, it was observed that the characteristic property of the substance $C_{22}H_{32}O_8$ is its exclusive sedative effect which does not have any influence on the patient's capability to react and to concentrate.

Compounding and Use:

The composition of the invention also provides compositions which comprise at least one ester thereof (that is, $C_{22}H_{30}O_8$, $C_{22}H_{32}O_8$ or $C_{22}H_{34}O_{10}$) and a diluting agent, binder and like additives. Suitable additives include pectin, gelatin, gum arabic, methyl cellulose, agar, tragacanth magnesium stearate and similar others. Alkaline or strongly acid adjuvants and filter materials are to be avoided.

The esters may be used in powder form in gelatin capsules, or in shaped solid form, such as, pills or dragees. They may also be used, individually or admixed, in the form of their solutions or suspensions in suitable solvents or suspending agents.

The esters of the invention are administered, for instance, orally in suitable dosage as of, for instance, 10 to 50 mg. or higher. Rectal administration in the form of suppositories may also be employed.

The individual esters and their mixture have most unusual and highly useful therapeutic effects. The compounds can not be classified with the conventional pharmacological categories and in accordance to traditional concepts.

The esters of the invention have been used with success in the treatment of various psychovegetative syndromes of constitutionally nervous patients, for instance, for treatment of mild neurotic reaction systems and mild environmental variations, various anxieties, tensions, depression, morbidity and pains and complaints resulting from organic malfunctioning. The tranquilizing effect is associated with a keener concentration, with dissociation from distracting environmental problems, and is conducive to more objective consideration of realities.

The esters of the invention are also admirably suited for treatment of symptons and diseases of the aged, particularly nervousness, difficulties in adjusting to situations and impulse difficulties. The esters were readily administrable without undesirable effects to aged patients prone to cerebral sclerotic conditions conducive to consciousness disruptions, and to organic reactions when under medication.

The esters are further remarkable in subduing abnormally high tension conditions. In the treatment of neuroepileptics, upon hypoglycemic shock conditions, and upon effects of alcohol or barbituates, the esters of the invention tone down and subdue the extreme reactions. Moreover, patients incapable of high and sustained concentration, according to standard tests, reacted upon administration of the ester of the invention in daily dosages from about 60 mg to about 900 mg or higher, (for instance, doses of 50 mg as dragees, taken 3 times daily for 3 to 4 weeks) with increased and more efficient productivity. Also, the responses of the patients showed a shift to more rapid reaction time. Particularly noticeable was the effect of the esters on counteracting the fatigue of the patients. In individuals with normal alertness and concentration abilities, the esters improved alertness and efficiency to function, and their productivity. The effects of the esters of the invention are most remarkable and unusual for compounds which have tranquilizing properties. Although the exact mode of action of these esters is not known, it is suggested that they provide what may be called an "interference-filter or screening" against certain foreign problem-creating stimuli. The esters appear to create a shielding effect against detrimental environmental factors while acting as a tranquilizer. Patients were able to maintain a better contact with reality, for instance, the social situation involving them, and to be less preoccupied with their diseases or serious disturbances. The clinical data of the esters indicates that they cause effects and approximate the as yet unattainable properties of an ideal tranquilizer which normalizes the emotional growth level without adversely affecting the alertness of the individual. The esters are remarkably free of sedative or hypnotic effects; their effects are not accompanied by feelings of tiredness and/or the risks of adversely affecting normal reactions, concentration ability and critical judgement.

The esters of the invention are especially useful when administered in individual doses of at least 50 mg. For adults, the esters can be administered three times a day in dragees of 50 mg. each for a period of 3 to 4 weeks; later, treatment administration can be reduced to 2 times a day. For serious disorders, for instance, cerebral sclerosis, dosage can be doubled. For children, the dosage may be correspondingly reduced.

No adverse side effects were observed upon continuous administration during many weeks of daily (over 24 hour periods) doses of 300 to 900 mg. of the esters. Blood pressure and the circulating systems showed no adverse effect; no changes were observed in blood corpuscle conditions or in urine analysis. Kidney and liver conditions were unchanged. Also significant is the fact that the central nervous system depressing effects of soporifics and of alcohol was not increased by the use of the drug of the invention. Patients with serious brain injuries who were treated with the instant esters for several weeks exhibited no effects on their state of awareness. At most with certain patients the drug caused a certain degree of awakeness comparable to that caused by drinking coffee.

In animals like dogs, administration of the drug showed a tranquilizing effect on motor activity with concurrent stimulus of the sensory abilities. Dogs had the tendency to be physically calm yet responded with acuteness to mild stimulus as well as with unusual alertness to words addressed to them.

Acute toxic doses of the compounds of the invention could not be administered. Administration of 100 mg/kg to 1,000 mg/kg to rats only resulted in digestive tract difficulties and contraction of the pyloris.

Standard tests for chronic toxicity showed no pathological changes; all organs were found normal. Extensive further testing were all satisfactory. The compounds of the invention administered individually or in mixture are thus highly useful drugs which approximate the perfect tranquilizer.

Methods and means for compounding the esters in pharmaceutical forms in solid and liquid carriers suitable for active medication are well known. Such methods and means are disclosed, for example, in U.S. Pat. Nos. 2,995,491; 2,997,442, and 3,210,247 and the references cited therein, all incorporated herein by reference.

We claim:

1. A therapeutically active isovaleric acid ester selected from the group consisting of the isovaleric acid ester of the empirical formulae $C_{22}H_{30}O_8$, $C_{22}H_{32}O_8$ and $C_{24}H_{32}O_{10}$, respectively, and of the structural formula

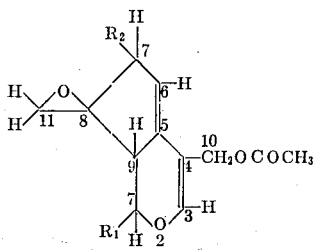

in which one of the two radicals $R_1$ and $R_2$ is isovaleroxy and the remaining one of $R_1$ and $R_2$ is isovaleroxy or acetoxyisovaleroxy and the ester wherein both $R_1$ and $R_2$ are isovaleroxy and the 5,6-position is dihydrosaturated.

2. The ester of claim 1 having the empirical formula $C_{22}H_{30}O_8$ in which $R_1$ and $R_2$ each one represents isovaleroxy, the ester having a refractive index of $n_D^{20} = 1.4906$ and an optical rotation of $[\alpha]_D^{21} = 172.2°$ (in methanol).

3. The ester of claim 1 having the empirical formula $C_{22}H_{32}O_8$ in which $R_1$ and $R_2$ each one represents isovaleroxy and the 5,6-carbon atoms being saturated with hydrogen atoms.

4. The ester of claim 1 having the empirical formula $C_{24}H_{32}O_{10}$, in which $R_1$ is an isovaleroxy group, $R_2$ is acetoxyisovaleroxy, said ester having a melting point of 83° to 84°C.

* * * * *